United States Patent [19]

Hickey

[11] Patent Number: 4,872,484

[45] Date of Patent: Oct. 10, 1989

[54] SYSTEM FOR CONTROLLING THE FLOW OF A FLUID MEDIUM RELATIVE TO AN OBJECT

[76] Inventor: John Hickey, Apt. 4A, 27 Bowdoin St., Boston, Mass. 02114

[21] Appl. No.: 283,507

[22] Filed: Dec. 12, 1988

[51] Int. Cl.4 .............................................. F15B 1/00
[52] U.S. Cl. ................................. 137/561 R; 415/914; 416/235
[58] Field of Search ................. 415/DIG. 1; 416/235; 137/561 R, 561 A; 251/126

[56] References Cited

U.S. PATENT DOCUMENTS

| | | | |
|---|---|---|---|
| 218,438 | 7/1866 | Heath | 416/231 R |
| 265,984 | 10/1882 | Schmolz | 416/235 |
| 1,331,997 | 7/1930 | Neal | 415/76 |
| 1,861,065 | 5/1932 | Poot | 416/235 |
| 1,903,823 | 4/1933 | Lougheed | 244/130 |
| 2,238,749 | 4/1941 | Peltier | 416/235 |
| 3,463,418 | 8/1969 | Miksch | 244/17.11 |
| 3,612,446 | 10/1971 | Lebert | 244/200 |

FOREIGN PATENT DOCUMENTS 164590 12/1980 Japan .................................. 416/235

Primary Examiner—A. Michael Chambers
Attorney, Agent, or Firm—Joseph S. Iandiorio; Brian M. Dingman

[57] ABSTRACT

A system for affecting the flow of a fluid medium relative to an object including a plurality of surface deviations disposed on the surface of the object. The deviations are grouped into at least one set and the sets are arranged into at least one predetermined pattern. The deviations cover only a portion of the object's surface.

25 Claims, 5 Drawing Sheets

SYSTEM FOR CONTROLLING THE FLOW OF A FLUID MEDIUM RELATIVE TO AN OBJECT

FIELD OF INVENTION

This invention relates to a system for controlling the flow of a fluid medium and more particularly to a number of deviations arranged in a predetermined pattern on the surface of an object for affecting the flow of a fluid medium as it moves relative to the object.

BACKGROUND

An object designed for smooth and efficient movement relative to a fluid medium such as air or water faces an obstacle called surface drag. As the object moves relative to the medium, its surface tends to tow along with it a sheath of air or water adjacent to the object's surface. This sheath, which envelopes the object's surface, tows along with it successive envelopes of air or water which ultimately create a near vacuum as the laminar flow of the medium leaves the object. This vacuum acts as a drag on the object's movement relative to the medium.

Prior art attempts at solving this problem have all been confined to placing uniformly spaced, sized, and shaped surface deviations over the entire surface of an object that contacts the fluid medium. These attempts, however, have failed to consider the fact that fluid mediums swirl upon contacting an object. In addition, placing surface deviations over the entire surface of an object can be costly, as well as time-consuming.

SUMMARY OF INVENTION

It is therefore an object of this invention to provide a number of surface deviations arranged in a predetermined pattern on a portion of the surface of an object which reduces the surface drag caused by the laminar flow of a fluid medium over an object.

It is a further object of this invention to provide such a pattern of deviations which decreases the adverse pressure gradient formed along the surface of the object.

This invention results from the realization that the flow of a fluid medium relative to an object can be altered by providing a plurality of properly arranged surface deviations on a portion of a surface of an object to reduce adverse pressure gradients and surface friction caused by the laminar flow of a fluid medium relative to the object's surface.

This invention features a system for affecting the flow of the fluid medium relative to an object. There is at least one surface of the object in contact with the fluid medium and on the surface are located a plurality of surface deviations which are grouped in at least one set. Additionally, the set is arranged in at least one predetermined pattern.

In a preferred embodiment, the deviations are concave indentations in the surface and the deviation sets are grouped in a pattern which defines a generally spiral form having a common central point from which the sets radiate. The deviations may be equal in size or may be of various sizes. The radial sets may curve in a clockwise or counterclockwise direction. Alternatively, the deviations may be projections from the surface of the object, and the deviation sets may be arranged in a pattern which defines a planar geometric figure such as a triangle. The object may be flexible and deformable, and may include a cloth or other thin, sheetlike material.

DESCRIPTION OF PREFERRED EMBODIMENT

Other objects, features, and advantages will occur from the following description of a preferred embodiment and the accompanying drawings, in which.

The system for controlling the flow of a medium relative to an object according to this invention may be accomplished by providing a plurality of deviations on the surface of an object which comes into contact with the fluid medium. The deviations are arranged in a predetermined pattern and include at least one set. The pattern may be a spiral formation with the sets extending radially from a common center or, alternatively, the pattern may take the form of a closed geometric figure.

The deviations may be unequal in size and may be provided as either depressions or projections from the surface of the object. In addition, the object may be flexible and deformable, and may include a clothlike fabric or other thin, sheetlike materials such as a sail, parachute or hang glider.

Figure 1:
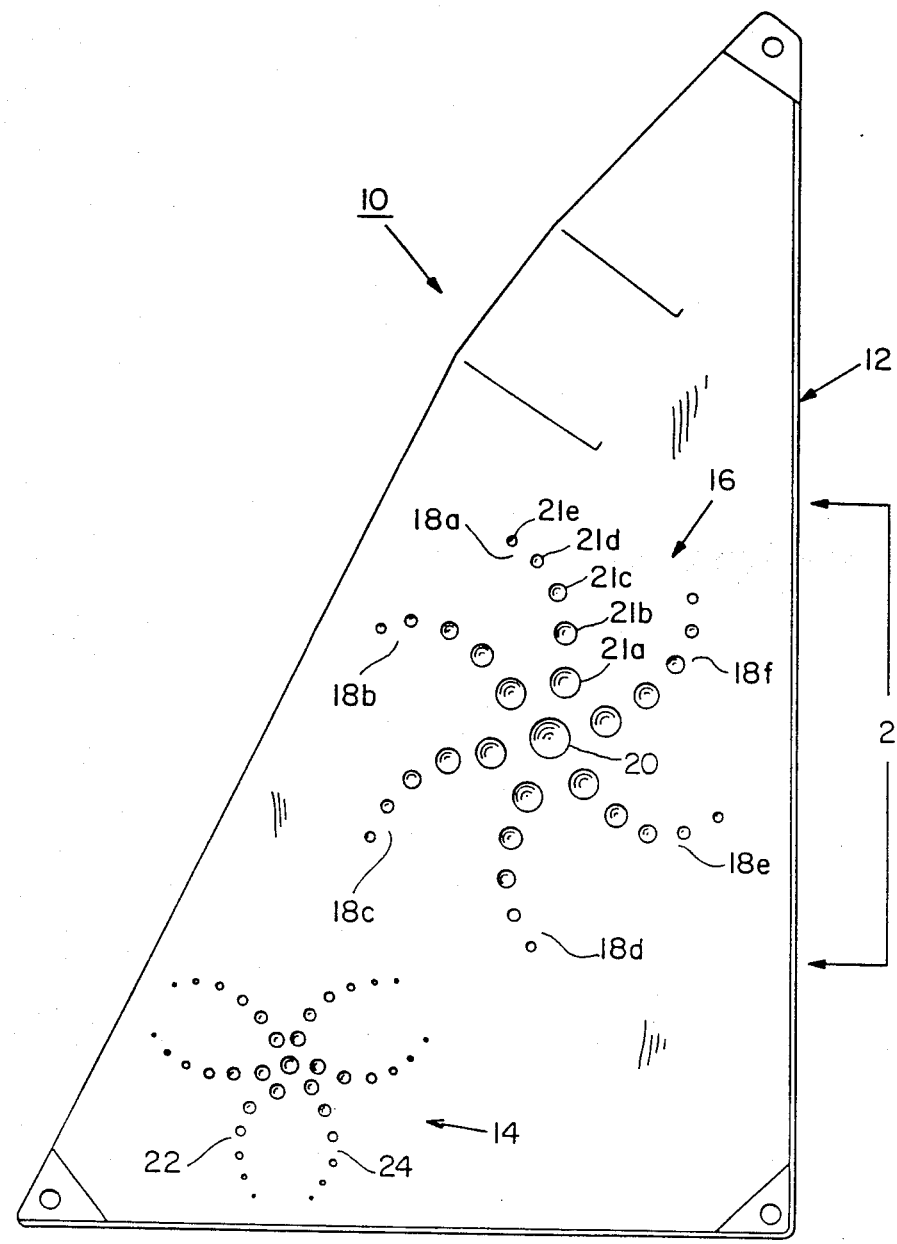
FIG. 1 is an axonometric view of a number of surface deviations including a plurality of sets arranged in a spiral pattern according to the present invention and disposed on a thin, flexible, sheetlike surface.

There is shown in FIG. 1 a system 10 for controlling the flow of air according to this invention, including object 12 in the form of a sailboat sail which is provided with flow-altering patterns 14 and 16. Spirally formed pattern 16 is comprised of curvilinear deviation sets 18a–18f which radiate from common center 20.

Whereas deviations sets 18a–18f have the same common shape and radiate in only the counterclockwise direction, pattern 14 includes deviation sets 22 and 24 which radiate in counterclockwise and clockwise direction, respectively.

Figure 2:
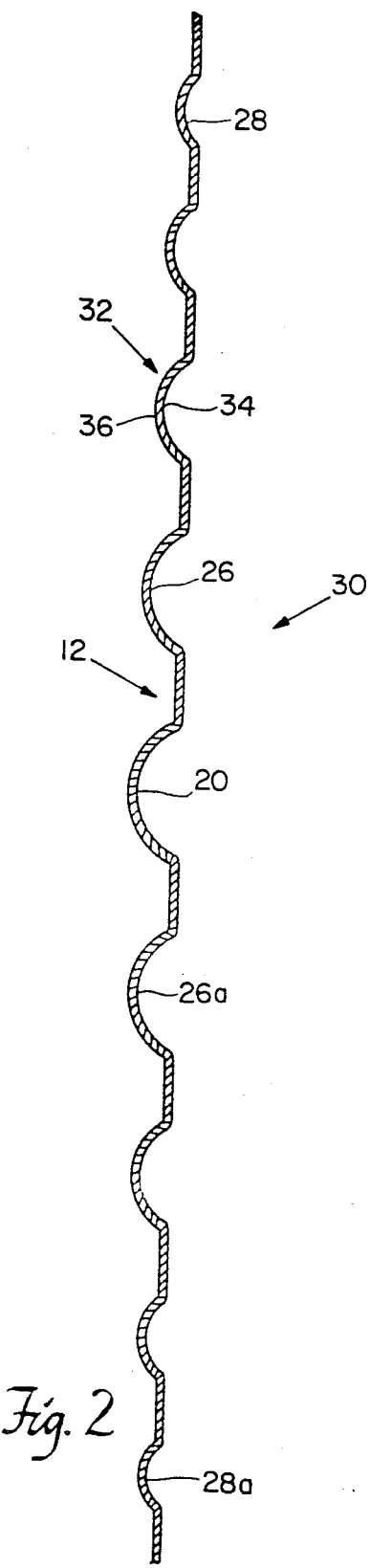
FIG. 2 is an end view taken along lines 2—2 of FIG. 1.

As shown more clearly in FIG. 2, the deviations may be of unequal size with deviation 20 being larger than deviation 26 and larger again than deviation 28. As illustrated, deviation 32 on object 12 becomes a projection from surface 36 and a depression from surface 34 in response to air flow in the direction of arrow 30.

Figure 3:
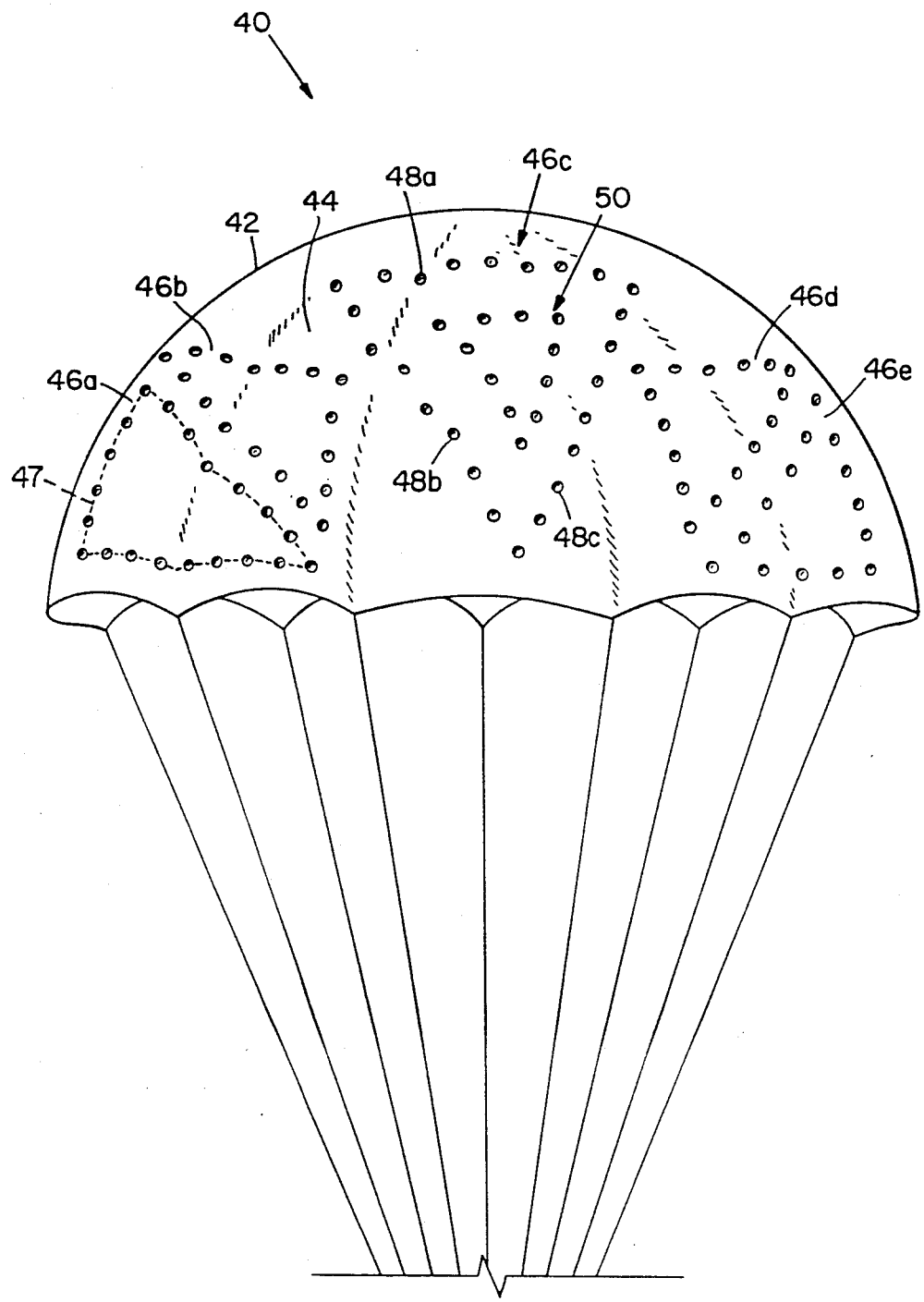
FIG. 3 is an axonometric view of a plurality of surface deviation sets grouped in geometric patterns defining triangles, according to the present invention.

An alternative system 40, FIG. 3, controls the flow of air relative to parachute 42 by providing surface 44 with a plurality of deviation patterns 46a–46e. The patterns of deviations such as 46c are formed by arranging deviation sets 48a–48c in such a manner as to define the geometric figure of a triangle as shown at 47. Deviation pattern 46c may also surround further patterns of deviations such as triangular-shaped deviation pattern 50.

Figure 4:
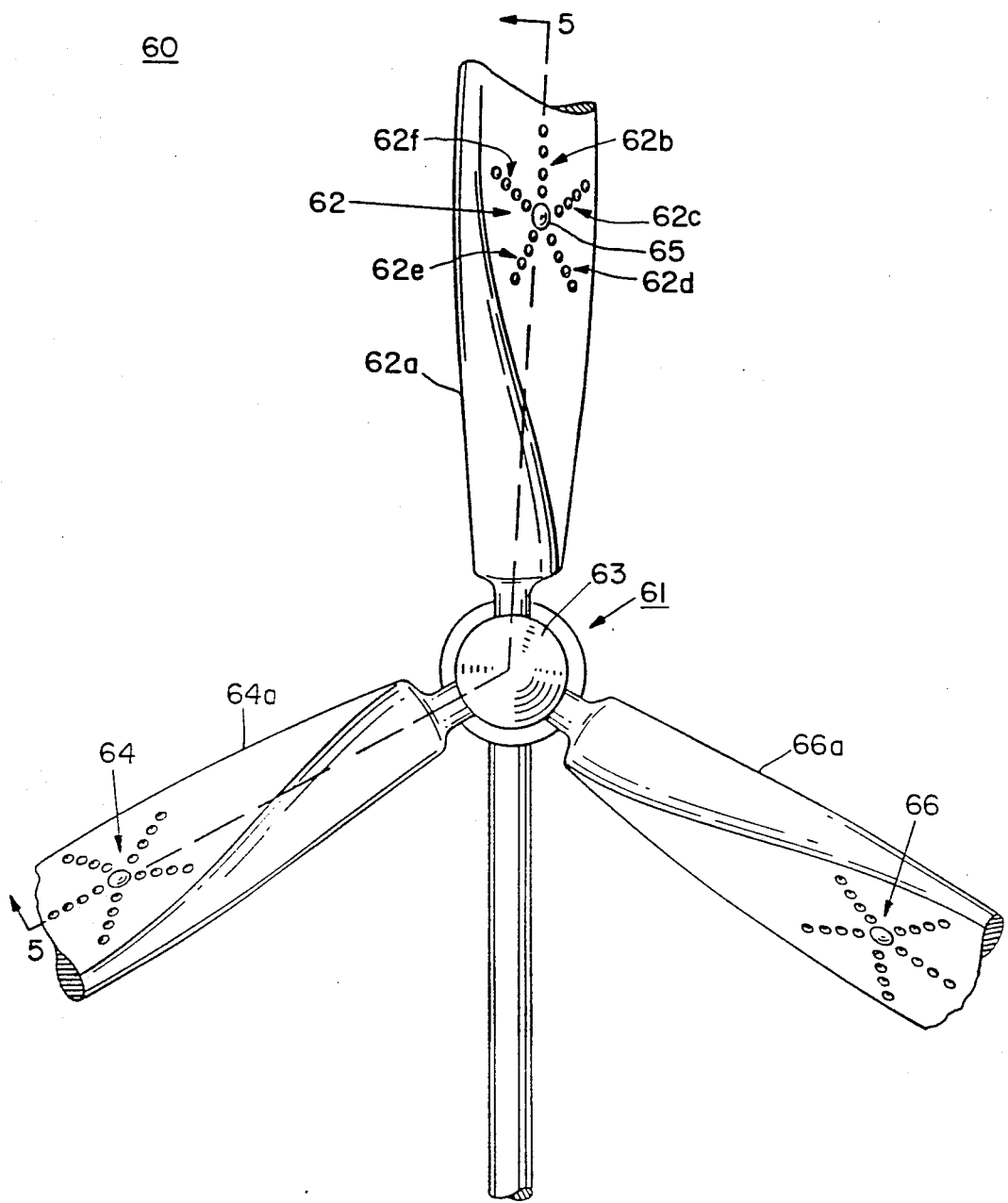
FIG. 4 is an axonometric view of a wind turbine on whose blades is disposed a radial surface pattern according to the present invention.

The system for controlling the flow of a medium is also effective on a nondeformable or rigid object. For example, system 60, FIG. 4, includes wind turbine 60 comprising turbine blades 62a, 64a, and 66a which radiate from center hub 63. Located on at least one surface of turbine blade 62a, 64a, and 66a are deviation patterns 62, 64, and 66, respectively. Each surface deviation pattern may include a number of deviation sets. For example, deviation pattern 62 includes deviation sets 62b–62f which radiate from central deviation 65. Although shown as identical and symmetrical patterns, surface deviation patterns 62, 64, and 66 could each be unique, asymmetrical patterns.

Figure 5:
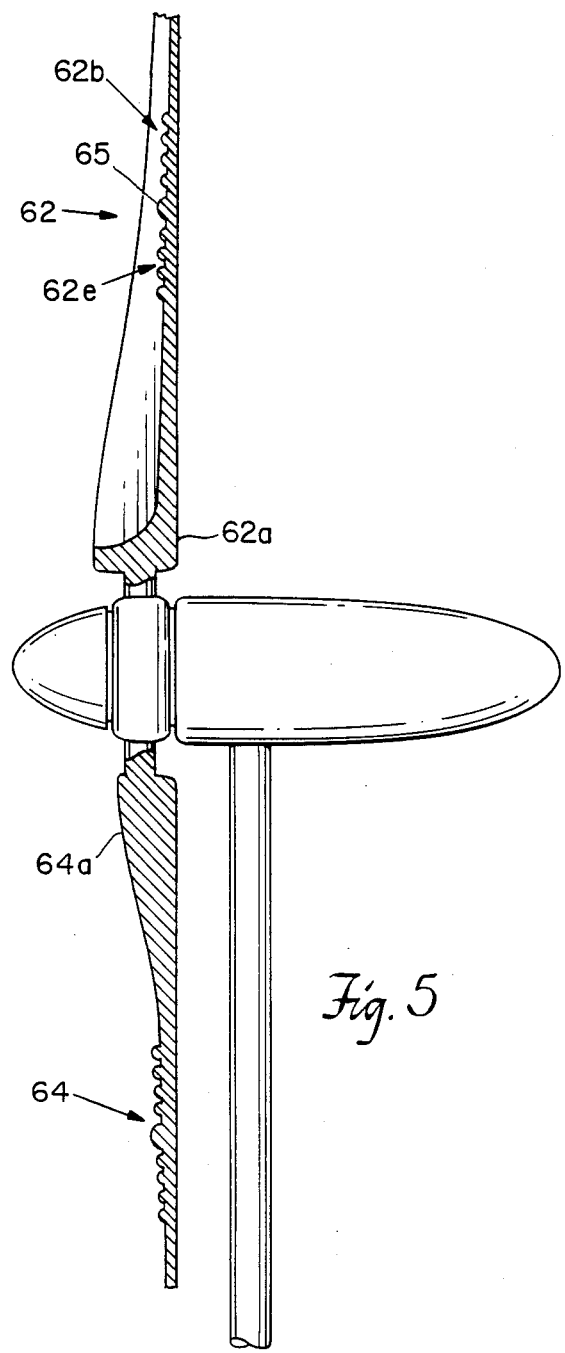
FIG. 5 is a side view taken along lines 5—5 of FIG. 4.

Surface deviation patterns 62 and 64, FIG. 5, are shown as protrusions from surfaces 62a and 64a, respectively. Surface deviation pattern 62, as illustrated, shows deviation sets 62b and 62e which radiate from central protrusion 65.

Although specific features of the invention are shown in some drawings and not in others, this is for convenience only as each feature may be combined with any or all of the other features in accordance with the invention.

Other embodiments will occur to those skilled in the art and are within the following claims:

What is claimed is:

1. A system for controlling the flow of air relative to an object comprising:
   an object having at least one surface in contact with the air flow;
   a plurality of deviations on each said surface and arranged in predetermined pattern, said pattern including at least one deviation set; and
   said pattern covering only a portion of said at least one surface and having a common central deviation with radially extending deviation sets.

2. The system of claim 1 in which said radially extending sets are curvilinear.

3. The system of claim 1 in which said deviations are concave indentations in said surface.

4. The system of claim 1 in which said deviations are projections from said surface.

5. The system of claim 1 in which said radially extending sets are equally spaced.

6. The system of claim 1 in which said deviations are of equal size.

7. The system of claim 1 in which said pattern defines a geometric figure.

8. The system of claim 7 in which said geometric figure includes a triangular shape.

9. The system of claim 1 in which said surface of said object is flexible and deformable.

10. The system of claim 9 in which said object includes a cloth or other thin, sheetlike material.

11. A system for controlling the flow of air relative to a flexible object comprising:
    an object having at least one flexible and deformable surface in contact with the air flow;
    a plurality of surface deviations disposed on only a portion of said surface and grouped in one or more sets; and
    said sets arranged in at least one predetermined pattern for disrupting the laminar flow of air relative to said object.

12. The system of claim 11 in which said deviations are concave indentations in said surface.

13. The system of claim 11 in which said deviations are projections from said surface.

14. The system of claim 11 in which said pattern has a common central deviation with curvilinear radially extending deviation sets.

15. The system of claim 11 in which said deviations are equal in size.

16. The system of claim 11 in which said pattern defines a geometric figure.

17. The system of claim 16 in which said geometric figure includes a triangular shape.

18. A system for affecting the flow of a fluid medium relative to an object comprising:
    at least one surface of said object in contact with the fluid medium;
    a plurality of surface deviations disposed on each said surface and grouped in at least one set, said at least one set arranged in a predetermined pattern; and
    said pattern defining a generally spiral form having a common central deviation point from which said sets radiate.

19. The system of claim 18 in which said sets are curvilinear.

20. The system of claim 19 in which said sets radiate in a counterclockwise direction.

21. The system of claim 19 in which said sets radiate in a clockwise direction.

22. The surface pattern of claim 18 in which said deviations are equally sized.

23. The surface pattern of claim 18 in which said deviations are of varying shape.

24. The surface pattern of claim 18 further including a plurality of said spirally formed patterns arranged on said surface.

25. The system of claim 18 in which said central point is a deviation.

* * * * *